(12) United States Patent
Cavalli et al.

(10) Patent No.: US 10,458,875 B2
(45) Date of Patent: Oct. 29, 2019

(54) HOLDING DEVICE FOR A RIM OF A VEHICLE WHEEL

(71) Applicant: Snap-on Equipment Srl a unico socio, Correggio (RE) (IT)

(72) Inventors: Gianluca Cavalli, Modena (IT); Emilio Ribecco, Carpi (IT); Paolo Sotgiu, Modena (IT)

(73) Assignee: SNAP-ON EQUIPMENT SRL A UNICO SOCIO, Correggio (RE) (IT)

( * ) Notice: Subject to any disclaimer, the term of this patent is extended or adjusted under 35 U.S.C. 154(b) by 0 days.

(21) Appl. No.: 14/693,826

(22) Filed: Apr. 22, 2015

(65) Prior Publication Data
US 2016/0313206 A1     Oct. 27, 2016

(51) Int. Cl.
*G01M 1/04*     (2006.01)
*B23Q 1/64*     (2006.01)

(52) U.S. Cl.
CPC ............. *G01M 1/045* (2013.01); *B23Q 1/64* (2013.01)

(58) Field of Classification Search
CPC ............ G01M 1/00; G01M 1/02; G01M 1/04; G01M 1/045; B23Q 1/64
USPC ...................................................... 157/16, 21
See application file for complete search history.

(56) References Cited

U.S. PATENT DOCUMENTS

| | | | | | |
|---|---|---|---|---|---|
| 2,197,808 | A | * | 4/1940 | Mason | G01M 1/045 157/18 |
| 2,356,864 | A | * | 8/1944 | Martin | H05K 13/02 269/243 |
| 2,437,305 | A | * | 3/1948 | Nickle | F16B 35/005 403/355 |
| 2,493,872 | A | * | 1/1950 | Henry | G01M 1/045 73/483 |

(Continued)

FOREIGN PATENT DOCUMENTS

| | | |
|---|---|---|
| CN | 101410704 A | 4/2009 |
| CN | 102896988 A | 1/2013 |

(Continued)

OTHER PUBLICATIONS

Extended European Search Report dated Apr. 8, 2016, issued in European Patent Application No. 15164730.2.

(Continued)

*Primary Examiner* — Tyrone V Hall, Jr.
(74) *Attorney, Agent, or Firm* — McDermott Will & Emery LLP

(57) ABSTRACT

A holding device for a rim of a vehicle wheel, comprising a base plate, a plurality of retaining elements, a synchronization element, and a locking element for locking a rotational position of at least one of the plurality of retaining elements or the synchronization element. The plurality of retaining elements and the synchronization element comprise corresponding coupling portions for form-fitting coupling of the rotational movement of the plurality of retaining elements and the synchronization element. Any one of the synchro- (Continued)

nization element or at least one of the plurality of retaining elements comprises an elastic coupling portion, biasing the corresponding coupling portions of the synchronization element and the retaining elements towards each other for ensuring the form-fitting coupling of the synchronization element and the plurality of retaining elements.

17 Claims, 9 Drawing Sheets

(56) References Cited

U.S. PATENT DOCUMENTS

| | | | | |
|---|---|---|---|---|
| 3,888,128 | A * | 6/1975 | Mitchell | G01M 1/12 157/21 |
| 3,995,498 | A * | 12/1976 | Curchod | G01M 1/045 73/480 |
| 4,445,792 | A * | 5/1984 | Trippett | F16C 17/024 384/103 |
| 4,530,239 | A * | 7/1985 | Scarinci | G01M 1/04 73/455 |
| 4,912,998 | A * | 4/1990 | Sugano | F16H 57/023 74/409 |
| 5,656,775 | A | 8/1997 | Kawabe | |
| 8,079,580 | B2 * | 12/2011 | Ohnesorge | G01M 1/045 269/55 |
| 8,911,282 | B2 * | 12/2014 | Mulder | B05B 13/0228 269/55 |
| 2009/0278295 | A1 * | 11/2009 | Ohnesorge | G01M 1/045 269/57 |
| 2013/0025797 | A1 | 1/2013 | Bonacini et al. | |

FOREIGN PATENT DOCUMENTS

| | | | |
|---|---|---|---|
| DE | 4437566 A1 * | 4/1995 | B60B 30/06 |
| DE | 102004052554 A1 * | 5/2006 | G01M 1/045 |
| DE | 102006005790 A1 | 7/2007 | |
| FR | 1236422 A | 7/1960 | |
| GB | 922649 A | 4/1963 | |

OTHER PUBLICATIONS

Search Report issued in Chinese Patent Application No. 201610222095.0, dated Dec. 19, 2018.

First Office Action issued in Chinese Patent Application No. 201610222095.0, dated Dec. 27, 2018 (with English translation).

* cited by examiner

HOLDING DEVICE FOR A RIM OF A VEHICLE WHEEL

The present invention relates to a holding device for a rim of a vehicle wheel, according to the preamble of independent claim 1.

In particular, the present invention relates to a holding device for a rim of a vehicle wheel, comprising a base plate having a central through hole, preferably, with a hollow shaft attached thereto, for sliding onto a shaft of a balancing machine, a plurality of retaining elements, which are rotatably mounted on the base plate, a synchronization element for synchronizing the rotation of the retaining elements, which is rotatably provided on the base plate, and a locking element for locking a rotational position of at least one of the plurality of retaining elements or the synchronization element. The plurality of retaining elements and the synchronization element comprise corresponding coupling portions for form-fitting coupling of the rotational movement of the plurality of retaining elements and the synchronization element.

In practice, it is known that in order to mount rims of vehicle wheels onto balancing machines it is preferable to use adapter or holding devices. Thereby, direct contact of the balancing machine with the surface of the rim can be avoided and the risk of thereby damaging parts of the surface of the rim can be reduced. In more detail, these adapter devices usually engage with the mounting holes of the rim through which the lug nuts or lug bolts are inserted when the wheel is fastened to the vehicle. By tensioning the rim against the balancing machine with the adapter device provided therebetween, pressure is only applied by the holding or retaining pins engaging with the mounting holes and no other portion of the surface of the vehicle rim.

However, the position of the mounting holes of the rim differs among different vehicle rims, such that a different adapter or holding device would be necessary for each particular vehicle rim. For this reason, various adaptable holding devices, which can be varied in size such that a single adapter device can be fitted to a plurality of different vehicle rims, have earlier been proposed.

For instance, a base plate having a central through hole for sliding over the shaft of the balancing machine was widely used. Mounted on the base plate there is provided a to planetary gear system comprising a central sun wheel mounted concentrically with the central through hole and a plurality of satellite wheels. Both the sun wheel and the satellite wheels comprise a geared outer surface in radial direction such that the rotation of each of the satellite wheels is coupled by means of the sun wheel. A retaining pin or element, which is respectively provided on each of the satellite wheels, thereby has its rotational movement synchronized with the movement of each of the other retaining elements or pins provided on the remaining planetary wheels. However, among other deficiencies detailed below, due to constructional tolerances and difficulties, such arrangement has shown not to ensure a sufficiently accurate coupling between the planetatary wheels that results in errors and a nonsatisfying outcome of the balancing operation.

EP patent 1 960 753 discloses a retaining device for a rim of a vehicle wheel, in which the form-fitting coupling between sun wheel and planetary wheels is additionally supported by the provision of a further frictional coupling means, for instance, a rubber O-ring, for frictional coupling of the rotary movement of the retaining elements in addition to the form-fitting coupling means, namely the gears. However, the additional frictional coupling element makes construction of the retaining device more complicated and by increasing the number of parts needed also more expensive. Further, as the frictional coupling element wears out, the durability of the retaining device becomes reduced, or in case the frictional coupling element needs to be replaced from time to time, maintenance for the retaining device according to this document also becomes more extensive and costly. Particularly, the O-ring as implemented up to now is difficult to attach, wears out and has to be replaced, thus resulting in the mentioned undesirable effects.

Further, according to the retaining or holding device of EP patent 1 960 753, the radial range of movement of the retaining elements or pins is limited by the size of the respective planetary wheels, as the retaining pin has to be mounted on the surface of the planetary wheel body. Even further, due to the locking mechanism implemented by the disclosed retaining device, it is difficult to obtain a predefined positioning of the rotational position of the planetary gear system, as the locking mechanism only provides for a continuous locking. More specifically, a locking element is arranged coaxially with the sun wheel and such that it can be adjusted in the axial direction relative to the sun wheel. The sun wheel can then be loaded with a retaining force by adjustment of the locking element, for instance by turning or screwing the locking element at an arbitrary rotational position of the sun wheel.

Accordingly, a retaining device for a rim of a vehicle wheel according to the state of the art shows several deficiencies, which are, for instance, the disadvantages connected with the additional frictional coupling element, the range limitation imposed by the retaining pins mounted on the planetary wheels and the non-reproducibility of a predefined locking position.

In view of these deficiencies, it is thus an object of the present invention to provide an improved retaining or holding device for a rim of a vehicle wheel, which allows for a more convenient use and which is less expensive and complex.

According to a first development of the present invention, a holding device for a rim of a vehicle wheel is provided. The holding device comprises the base plate having a central through hole, preferably, with a hollow shaft attached thereto for sliding onto a shaft of a balancing machine, a plurality of retaining elements, which are rotatably mounted on the base plate, a synchronization element for synchronizing the rotation of the retaining elements, which is rotatably provided on the base plate, and a locking element for locking a rotational position of at least one of the plurality of retaining elements or the synchronization element. The plurality of retaining elements and the synchronization element comprise corresponding coupling portions for form-fitting coupling of the rotational movement of the plurality of retaining elements and the synchronization element. Any one of the synchronization element or at least one of the plurality of retaining elements comprises an elastic coupling portion, wherein the elastic coupling portion biases the corresponding coupling portions of the synchronization element and at least one of the plurality of retaining elements towards each other for ensuring the form-fitting coupling of the synchronization element and the plurality of retaining elements.

In other words, the retaining elements and the synchronization element comprise corresponding coupling portions for a form-fitting coupling and in addition an elastic coupling portion to ensure the form-fitting coupling. Accordingly, there is provided a form-fitting coupling and an additional elastic coupling for ensuring the form-fitting coupling, but no need exists for additional frictional coupling between the retaining elements and the synchronization element, respectively. Preferably, the elastic coupling portion ensures the play in the form-fitting coupling to be as little as required by the particular appliance. The holding device according to the first embodiment of the present invention thus makes friction coupling elements redundant and comprises of less distinct parts. Thereby, it generates less abrasion, leading to less maintenance effort and in the consequence a more efficient and more cost-efficient device.

In this development, the synchronization element is preferably provided concentrically with the central through hole and mounted on top of the base plate. Thus, the retaining elements can be provided at radially outward positions with respect to the central through hole on the base plate.

In another development of the present invention, the locking element provides discrete locking positions of at least one of the plurality of retaining elements or the synchronization element with respect to the base plate. This solution can also be used independent from the foregoing description of the inventive idea. Thus, a holding device comprising the elements of preamble of attached claim 1, can be combined with a design of the locking element defined above.

By providing discrete locking positions of at least one of the plurality of retaining elements or the synchronization element with respect to the base plate, it is possible to adjust the position of the retaining elements and thus the rim of a vehicle wheel held by the holding device at a predetermined or predefined position. In other words, adjusting the holding device to fit with a rim of a particular vehicle wheel becomes easier, as it is possible to lock the position of the retaining elements and the synchronization element precisely at a discrete and predefined position corresponding to a dimension of the respective vehicle rim.

In a preferred embodiment of the holding device of the present invention, each of the plurality of retaining elements is configured as a satellite wheel and the synchronization element is configured as a sun wheel, wherein the satellite wheel and the sun wheel form a planetary gear system.

By providing the retaining elements and the synchronization element as a planetary gear system, it is possible to couple the rotational movement of each of the retaining elements with the rotation of the synchronization element in an easy manner. Moreover, the provision as a planetary gear system allows for each of the retaining elements to be rotated in the same direction, i.e. if one of the retaining elements is rotated clockwise, each of the remaining retaining elements is also rotated clockwise with the same angle of rotation and vice versa. The same radial distance of a particular portion of the retaining elements can thus be assured with respect to the central through hole.

In one development of the holding device of the present invention the corresponding coupling portions of the synchronization element and the plurality of retaining elements are corresponding toothed rims provided to the outer circumference of the respective elements.

Accordingly, toothed rims are provided to the outer circumferential surface of the retaining elements and the synchronization element. Toothed rims provide for a form-fitting coupling, which is not subject to substantial frictional coupling and thus requires little maintenance. In particular, toothed rims as an example of form-fitting coupling do not wear out as easily as frictional coupling elements, such as rubber coupling elements, for instance O-rings. Further, the corresponding toothed rims provide for a secure and reliable form-fitting coupling between the synchronization element and the plurality of retaining elements as known in the art.

In a preferred development of the holding device of the present invention the retaining elements each comprise a base portion having a central mounting portion for mounting the retaining element on the base plate and for defining a rotation axis of the respective retaining element, and a retaining portion mounted on the base portion for engaging with the rim of the vehicle wheel. The coupling portions of each of the retaining elements are provided concentrically with the central mounting portion to the outer circumferential side of the base portion.

Both the coupling portion and the base portion of each of the retaining element are preferably substantially circular, such as to provide an improved coupling of the retaining element with respect to the synchronization element upon rotation of the base portion of the retaining element about the central mounting portion.

In this development, all retaining elements are constructed in the same way. However, in a different development, it is also possible to design one or more of the retaining elements different from the others.

In a further development of the holding device of the present invention, the base portion has an outer peripheral diameter smaller than the inner peripheral diameter of the coupling portion, such that a gap is formed between the coupling portion and the base portion, and wherein the elastic coupling portion is provided in the gap between the coupling portion and the base portion for elastically coupling the base portion and the coupling portion.

By providing the elastic coupling portion in a gap formed between the base portion and the coupling portion of the retaining element, it is possible to elastically couple the coupling portion of the retaining element with the corresponding coupling portion of the synchronization element. Thereby, a tight form-fitting coupling is assured, without the need of providing additional frictional coupling means.

In one development, the elastic coupling portion is preferably a plurality of curved flat springs or strings provided in the gap between the coupling portion and a base portion.

The plurality of flat springs or strings preferably protrudes in a substantially tangential direction from the base portion to the coupling portion.

The plurality of curved flat springs or strings is preferably in contact with the coupling portion, such that the central axis of the coupling portion can be shifted with respect to the central axis of the base portion. The elastic coupling element thus provides for a floating bearing of the coupling portions of the synchronization element and the retaining element.

In one development, the number of flat springs or strings is preferably three, wherein the three springs or strings are arranged equidistantly about the entire outer peripheral surface of the base portion. However, in different developments the number of flat springs or strings can also be different, such as between two and twenty, and the arrangement about the base portion can also be different. Moreover, any kind of springs may be used, e.g. even traditional helicoidal springs. Additionally, the elastic coupling could also be realized by inserting an elastic portion (e.g. made of rubber or similar materials) between the base portion and the coupling portion.

Although in this development the elastic coupling portion is comprised in at least one retaining element, in a different development, the elastic coupling portion can also be comprised in the synchronization element to elastically couple the coupling portion of the synchronization element, instead.

In a further development of the present holding device, the central mounting portion is arranged to mount the base portion to a radially extended slot formed in the base plate, and wherein the elastic coupling portion is arranged such that the central mounting portion is elastically coupled to the base portion within the radial slot.

In this development, as the elastic coupling is arranged within the radial slot formed in the base plate, the base portion of the retaining element and thus the entire retaining element can be designed less complicated. For instance, the retaining element can be a simple geared wheel in this development, as there is no need for a gap for positioning the elastic coupling element between the main body and a geared rim of the retaining element.

The elastic coupling of the elastic coupling portion is in one development preferably a spring loaded within the radial slot of the base portion. This coupling spring preferably biases the central mounting portion of the retaining element towards the center of the base plate and thus assures a tight form-fitting coupling between the retaining element and the synchronization element, or more precisely the coupling portion of the retaining element and the coupling portion of the synchronization element, respectively.

In one development, the central mounting portion comprises a screw for screwing the respective retaining element to the base plate and a bushing provided between the base portion and the screw.

Bushing and screw provide for a tight and releasable attachment of the retaining element to the base plate. However, in other developments, also other attachment means for attaching the retaining element to the base plate are contemplated, such as snap-on attachment means or other attachment means known in the art.

In a further development of the holding device of the present invention, the retaining portion is formed by a retaining bolt which is replaceably mountable to the base portion by means of a retaining bolt mount such that the retaining bolt is arranged eccentrically to the axis of rotation of the retaining element.

By providing the retaining bolt eccentrically to the axis of rotation of the retaining element, it is possible to adjust the distance of the retaining bolt from the central axis of the base plate of the holding device by rotating the retaining element. Thereby, the individual size of the rim of the vehicle wheel to be balanced on a balancing machine can be accounted for. Since the retaining bolt is replaceable, it can also be configured as needed for the particular vehicle rim to be balanced. For instance, a retaining bolt can be provided thicker, thinner, longer, shorter, shaped differently, and the like, dependent on the layout and shape of the vehicle wheel to be used.

In a preferred development of the holding device, the retaining bolt mount is arranged as an adapter pin with a thinner diameter than the retaining bolt, wherein the adapter pin is arranged to engage with a recess in the base portion and with a recess in the retaining bolt.

By providing the retaining bolt mount with a thinner diameter than the retaining bolt, it is possible to provide the retaining bolt mount closer to the outer radial circumference of the base portion than with a thicker diameter. This is due to the fact that a recess formed in the base portion is allowed to have its center and thus the central axis of the retaining bolt closer to the edge of the base portion as the recess gets thinner. Accordingly, the operation range, which is defined as the difference between a minimum and a maximum of the distance of the retaining bolt from the central axis of the base plate, gets increased.

In a different development of the holding device of the present invention, the retaining bolt mount comprises a support lip and an adapter pin, wherein the support lip is mounted on the base portion and wherein the adapter pin is provided on a radially outward position on the support lip and arranged to engage with a recess in the retaining bolt.

In other words, in this development the adapter pin is not attached to the base portion, but to the support lip instead. With this arrangement, it is possible to extend the distance between the mounting position of the retaining bolt and the central mounting portion to the extension of the support lip. Accordingly, in case the support lip is larger than the base portion or even the coupling portion of the retaining element, it is thus possible to provide the retaining bolt at a distance from the central mounting portion that is larger than the size of the base portion and the coupling portion, respectively.

In a further preferred development of the holding device of the present invention, the synchronization element comprises a substantially circular synchronization body portion, arranged parallel to and concentrically with the through hole of the base plate, having a central through hole with a diameter corresponding to the diameter of the through hole of the base plate or larger, wherein the coupling portion is provided to the radial outer peripheral surface side of the synchronization body portion, and wherein the synchronization element comprises the elastic coupling portion for elastically coupling the coupling portion in a radial direction with respect to the central through hole, wherein the elastic coupling portion is provided within the central through hole or sandwiched between the coupling portion and the synchronization body portion.

Since the elastic coupling portion can also be provided at the synchronization element and provided within the through hole or sandwiched between the coupling portion and the synchronization body portion, a tight form-fitting coupling between the coupling portion of the synchronization element and the respective coupling portions of the retaining elements can be achieved. Also in this development, no need for a further frictional coupling means exists between the respective coupling portions. Moreover, the coupling position can be designated expandable.

In a further preferred development of the holding device of the present invention, the locking element comprises a locking portion, at least one recess formed in the base plate on the surface facing the synchronization element, and at least one recess formed in the synchronization element on the surface facing the base plate, wherein the locking portion is arranged to simultaneously engage with one recess formed in the base plate and one recess formed in the synchronization element.

Since the locking portion of the locking element engages simultaneously with a recess formed in the synchronization element and a recess formed in the base plate, discrete locking positions of the synchronization element with respect to the base plate can be defined. In other words, every corresponding recess formed in the synchronization element and in the base plate provide for a discrete locking position. In this development it is thus advantageously possible to precisely adjust the position of, for instance, a retaining bolt, to a predetermined or preset distance from the central axis by engaging the locking portion with corresponding, predefined recesses.

Preferably, the at least on recess formed in the base plate and the at least one recess formed in the synchronization element are arranged concentrically with respect to the central axis of the base plate such that the locking portion can easily engage with each pair of corresponding recesses.

In a preferred development of the holding device of the present invention, at least one of the recesses formed in the base plate or the synchronization element is configured as a locking through hole, wherein the locking portion is arranged to fit into the locking through hole from the side of the base plate or the synchronization element, respectively, opposite of the contacting surface of the base plate and the synchronization element.

Since the locking portion is arranged to fit into the locking through hole from the side opposite to the contacting surface side of the synchronization element and the base plate, the locking portion can be inserted and preferably also removed without the need of disassembling the synchronization element and the base plate. In other words, the locking portion can be inserted such that it engages with both the synchronization element and the base plate, without a need for the synchronization element and the base plate to be separated from each other.

In a further preferred development, the locking portion is arranged to fit into the locking through hole by screwing a male thread of the locking portion into a corresponding female thread of the locking through hole.

By providing a threaded connection of the locking portion with the through hole of the synchronization element or the base plate, the locking portion can be inserted into and removed from the locking through hole in an easy and straightforward manner.

Although a screwed connection is preferred in this development, also other forms of attachment, such as a snap-on attachment, a welding or adhesive attachment, and the like, are contemplated by a skilled person in further developments of the invention.

In one development, a single locking through hole is provided and multiple recesses are formed on the surface side opposite of the locking through hole. However, in a further preferred development, the number of locking through holes and corresponding locking portions is, for instance, four or six, wherein the various locking through holes and corresponding locking portions are arranged at equal distances in radial direction from the central through hole and at equal distances in circumferential direction about the rotating axis.

In a preferred development, the number of concentric recesses, which the locking portion is adapted to engage with, provided about an entire circumference is between 3 and 1000, preferably between 3 to 720, more preferably between 30 to 180 and even more preferably 60. Moreover, it has to be noted that the recesses may disposed at positions that are equally or not equally spaced in the circumferential direction. The exact circumferential distance between recesses may in principle be calculated so that the angular distance between two successive recesses may be made to correspond to a specific radial displacement of the retaining elements, with respect to the main axis of the device. In a preferred embodiment, several recess are provided in an uneven distance to each other in the circumferential direction.

In a further preferred development of the holding device of the present invention the locking portion is configured as a spring pin, wherein the spring pin comprises a spring and a spring-loaded pin or ball, wherein the spring pin is arranged for engaging the recess of the base plate or the synchronization element by means of the spring-loaded pin or ball due to an expansion of the spring.

Since the locking portion is configured as a spring pin, the locking of the synchronization element and the base plate can be achieved by means of the spring loaded or biased pin or ball, without having to displace the entire spring pin. Accordingly, such spring pin can be fitted into the locking through hole such that the spring-loaded pin or ball protrudes from the surface side thereof. The locking force is thus defined by the spring force loading the pin or ball into the recess opposite of the locking through hole. In other words, in order to release the discrete locking of the locking element it is thus needed to overcome the biasing force of the spring-loaded pin being engaged within the recess opposite of the locking through hole the spring pin is provided in. In this development, it is thus possible to provide a discrete locking mechanism which can easily be released by overcoming the force of the spring loaded pin or ball with a sufficient rotational force of the synchronization element relative to the base plate.

In a different embodiment of the present invention, a retaining element for removably retaining a rim of a vehicle wheel for a holding device comprises a base portion having a central mounting portion for mounting the retaining element on a base plate of a holding device and for defining a rotation axis of the retaining element, a retaining bolt for engaging with the rim of the vehicle wheel, a retaining bolt mount for replaceably mounting the retaining bolt on the base portion, such that the retaining bolt is arranged eccentrically to the rotation axis of the retaining element, and a coupling portion provided concentrically with the central mounting portion to the outer circumferential side of the base portion. The retaining bolt mount comprises a support lip and an adapter pin, wherein the support lip is mounted on the base portion, preferably by means of the central mounting portion, and wherein the adapter pin is provided on a radially outward position on the support lip and arranged to engage with a recess in the retaining bolt.

Since the retaining bolt mount of the retaining element comprises a support lip, the adapter pin and thus the retaining bolt is not limited by the size of the base portion in the radial direction with respect to the central mounting portion. In other words, it is thus possible to increase the radius of operation of the retaining bolt over the extension of the base portion of the retaining element. It is thus possible to adapt the retaining element for a broader variety of rims of vehicle wheels and thus avoid the need of providing different retaining elements for different sizes of rims of vehicle wheels.

Further advantages and preferred embodiments of the present invention will be described in the following together with the drawings listed below.

Figure 1:
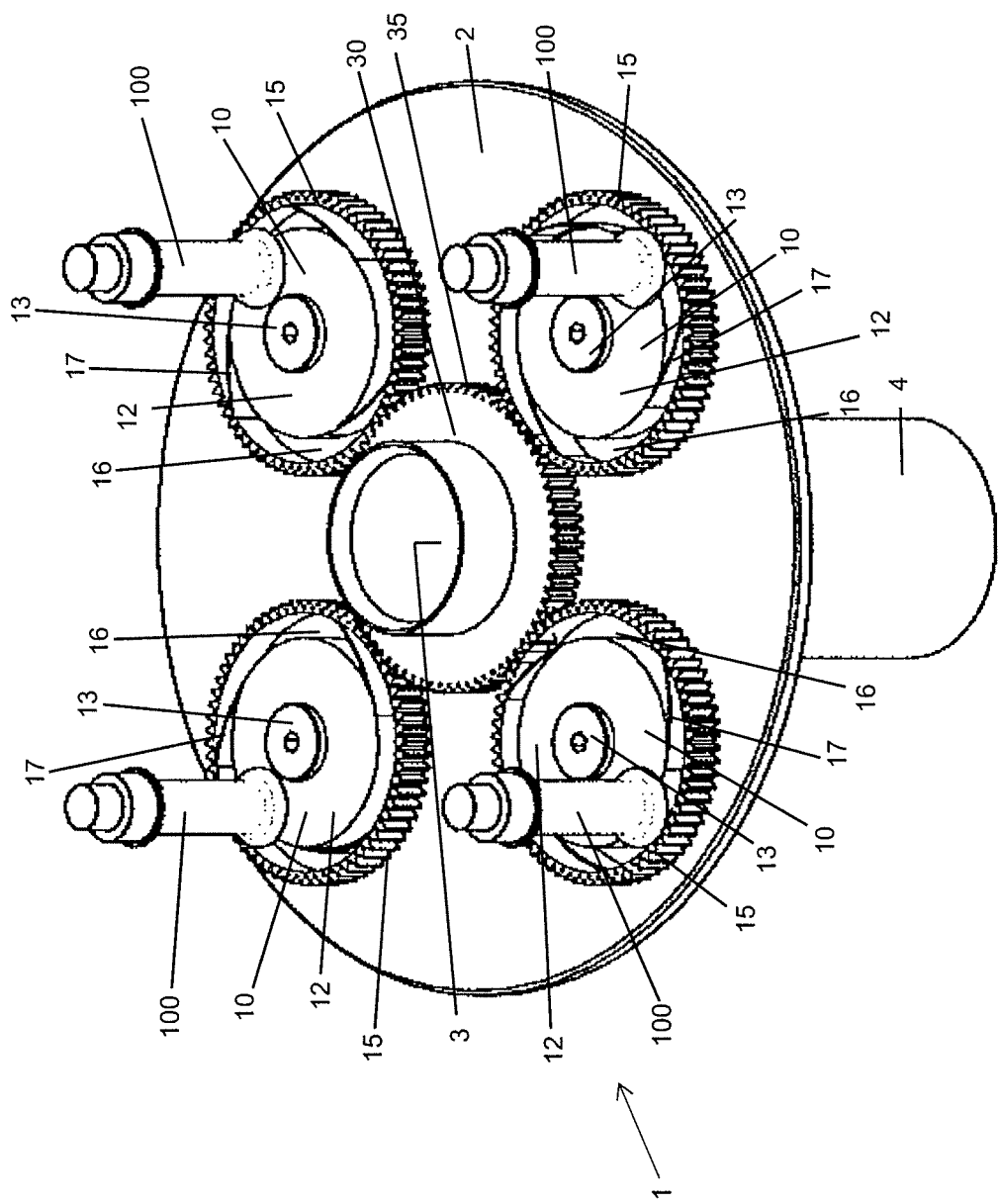
FIG. 1 shows a perspective view of an exemplary holding device according to the present invention.

First, an example of a holding device for a rim of a vehicle wheel according to the present invention is described with reference to FIGS. 1, 2 and 3. In particular, FIG. 1 shows a perspective view, FIG. 2 a cross-sectional view and FIG. 3 a top view of the exemplary holding device according to the invention.

The exemplary holding device 1 comprises a substantially circular base plate 2 with a through hole 3 provided in the center thereof. Through hole 3 is arranged and sized such that the holding device 1 can be slid over the axis of a balancing machine for balancing a rim of a vehicle wheel. Holding device 1 further comprises a hollow shaft 4 provided within and fitted to the through hole 3.

On the upper surface side of base plate 2 there are provided a synchronization element 30 and four retaining elements 10. The synchronization element 30 is provided concentrically with the central through hole 3 and the plurality of retaining elements 10 is provided on the base plate 2 at equal distances in a radial direction and evenly distributed in a circumferential direction, such that the synchronization element 30 abuts the retaining elements 10 on a peripheral surface thereof. In this context, the axial direction refers to the direction of the central through hole 3, or to the axial direction of the hollow shaft 4, respectively. A radial direction refers to a direction being perpendicular on the axial direction and pointing towards the outer peripheral circumference of the base plate 2. Finally, a circumferential direction refers to a rotational direction about the central axis.

In the exemplary holding device 1, the synchronization element 30 is configured as a sun wheel, and the four retaining elements 10 are respectively configured as satellite wheels that form a planetary gear system together with the sun wheel.

However, it is of course contemplated to provide a different number of retaining elements 10, respectively satellite wheels, in another example of the present invention. In other examples, the number of retaining elements 10 can for example be more or less than four, for instance five, six or a different number, as needed for the respective vehicle rim to be balanced. Further, it is also possible to provide different coupling mechanisms instead of the sun wheel/satellite wheel planetary gear system as in the present example.

Figure 6:
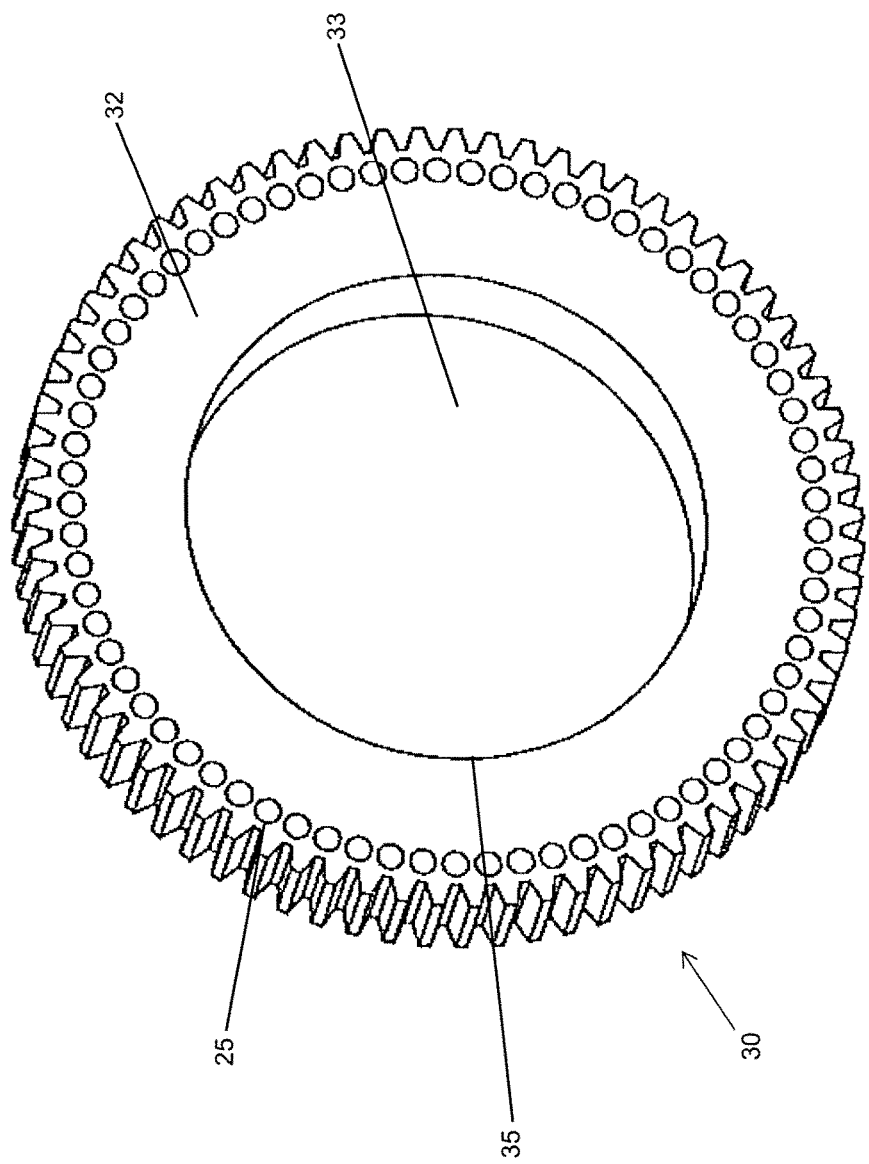
FIG. 6 shows a perspective view of the lower surface side of the synchronization element according to the present invention.

The synchronization element 30 configured as the sun wheel in the present example will be described in further detail below with reference to FIG. 6.

Each of the retaining elements 10 comprises a base portion 12 having a central mounting portion 13 for mounting the retaining element 10 on the base plate 2. Further, the central mounting portion 13 defines the rotation axis of the respective retaining element 10 such that the retaining element 10 can rotate parallel to the base plate 2. Each retaining element 10 further comprises a coupling portion 15 provided on the outer circumference of the respective retaining element 10. The coupling portion 15 is provided with a larger diameter than the outer circumferential diameter of the base portion 12, such that a gap 16 is formed between base portion 12 and coupling portion 15 in the radial direction with respect to the central mounting portion 13.

On the outer circumferential surface of coupling portion 15 toothed rims are provided that couple with corresponding toothed rims provided to an outer circumference of a coupling portion 35 of the synchronization element 30, which will be described later in more detail.

Figure 5:
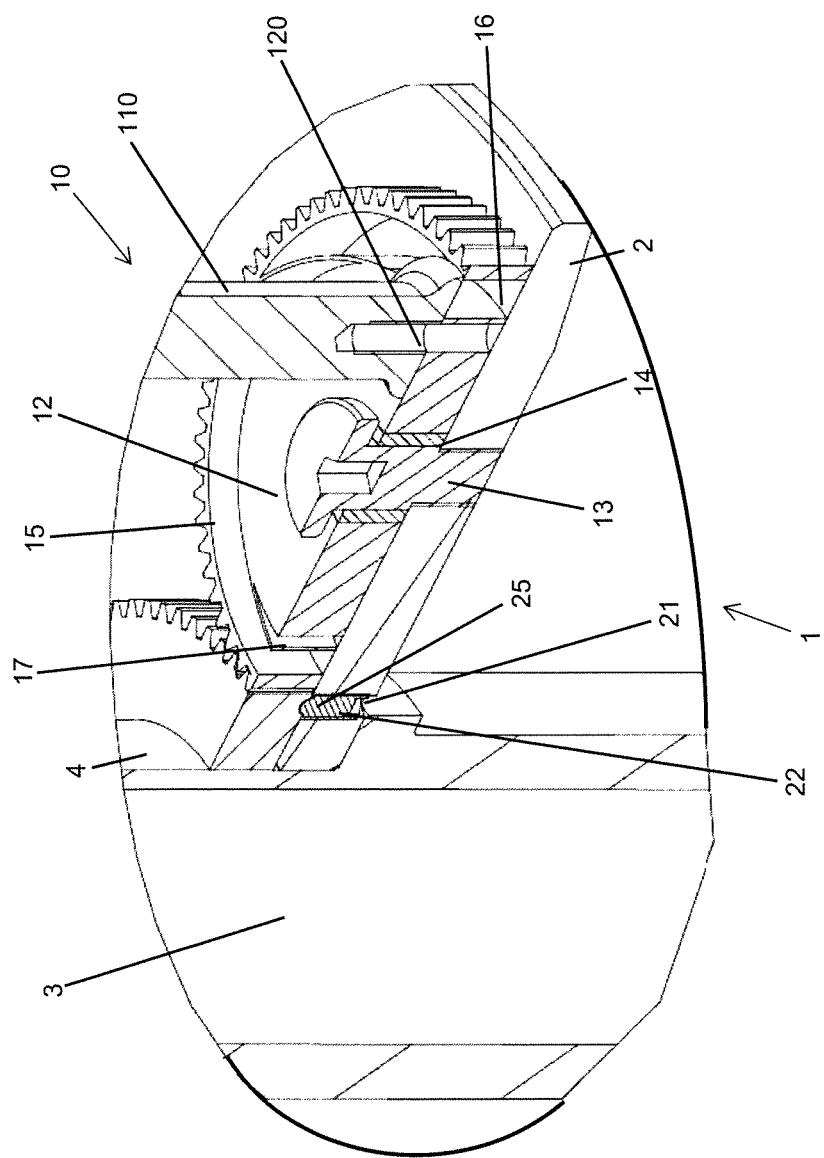
FIG. 5 shows a perspective cross-sectional view of a locking element of the exemplary holding device according to the invention in more detail.

In gap 16 between base portion 12 and coupling portion 15, an elastic coupling portion 17 is provided that elastically couples the base portion 12 to the coupling portion 15. In this example, the elastic coupling portion 17 consists of three curved flat springs or strings that protrude in a substantially tangential direction from the base portion 12 to the coupling portion 15 and are in contact with the coupling portion 15. By means of the elastic coupling portion 17, respectively the plurality of flat springs or strings in this embodiment, the central axis of the coupling portion 15 can be shifted with respect to the central axis of the base portion 12 defined by the central mounting portion 13. In other words, the elastic coupling portion 17 provides for a floating bearing of the coupling portion 15 with respect to the central axis of the respective retaining element 10. As illustrated in FIG. 5, the elastic coupling portion 17 can be fixedly attached to the base portion 12 and to the coupling element 15. In this example, the fixed attachments are achieved by the elastic coupling portion 17, base portion 12, and coupling element 15 being one integrated piece.

In this example, the elastic coupling element consists of three curved flat springs, respectively provided in the gap 16 between base portion 12 and coupling portion 15. In other examples, also different forms of elastic coupling between coupling portion 15 and base portion 12 are contemplated by a person skilled in the art.

Although in this example the central axis of the coupling portion 15 can be shifted with respect to the central axis of the base portion 12, by means of the elastic coupling element 17, this shifting is restricted to the radial direction only. In other words, coupling portion 15 cannot rotate about the central axis defined by the central mounting portion 13 without the base portion 12 following the rotation. Thus, by means of elastic coupling portion 17, a fixed rotational correlation between coupling portion 15 and the remaining parts of retaining element 10 can be accomplished.

Next, each retaining element 10 comprises a retaining portion 100 mounted eccentrically to the axis of rotation of the respective retaining element on an upper surface thereof. The respective retaining portion 100 is arranged to engage with a corresponding portion of the rim of the vehicle wheel upon use. By rotating one of the retaining elements 10, the remaining retaining elements 10 follow the rotational movement of the first retaining element 10 such that the retaining portions 100 of the respective retaining elements 10 are all positioned at the same distance with respect to the central through hole 3 of base plate 2. Further, as the rotation of the four retaining elements 10 in this example is coupled with respect to each other such that the rotational direction of all retaining elements 10 is the same, also the circumferential separation among the respective retaining elements 10 is maintained upon rotation of any of the four retaining elements 10. Thereby, a radial distance of the retaining portions 100 with respect to the central through hole 3 can be adjusted by rotating any of the retaining elements 10 or the synchronization element 30.

Figure 4:
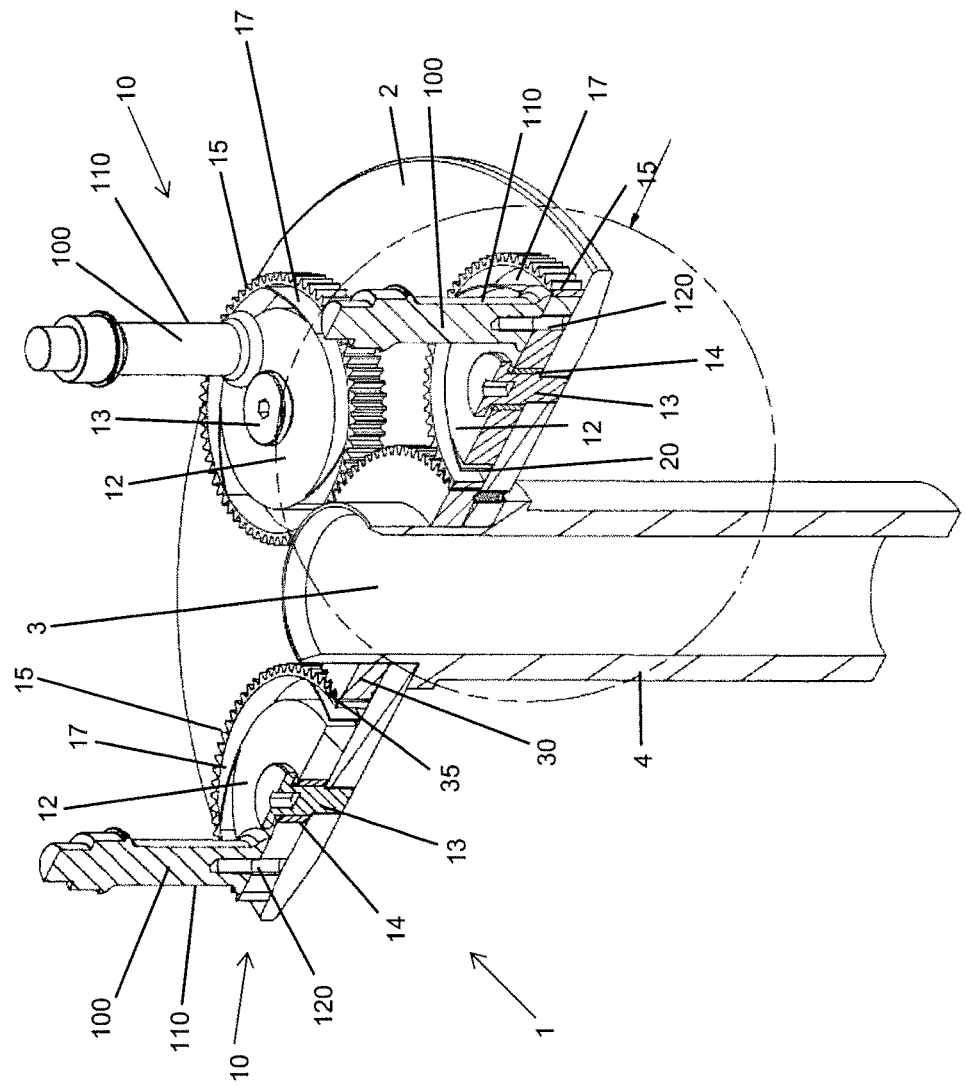
FIG. 4 shows a perspective cross-sectional view of the holding device according to the present invention.

The retaining portions 100 are now described in more detail with regard to FIGS. 4 and 5. Each retaining portion 100 comprises a retaining bolt or pin 110 protruding perpendicular with respect to and from the base plate 2 coaxially with the rotation axis defined by hollow shaft 4, and a retaining bolt mount 120 for mounting the retaining bolt 110 to the base portion 12 of the retaining element 10. In the present example, the retaining bolt mount 120 is a pin of smaller diameter than the retaining bolt 110 that engages with both a recess in the lower surface of the retaining bolt 110 and the upper surface of the base portion 12. Both recesses correspond in diameter to the diameter of retaining bolt mount 120. Retaining bolt 110 can in one example easily be removed from retaining bolt mount 120 by pulling retaining bolt 110 apart from base portion 12. In other examples, a person skilled in the art considers different forms of attachment means of retaining bolt 110.

In one example, the cap or head of the retaining bolt 110 can be replaceable and/or comprise an elastic material, such as rubber, in order to allow the retaining bolt 110 to be press fitted into a mounting hole of a vehicle rim.

Figure 2:
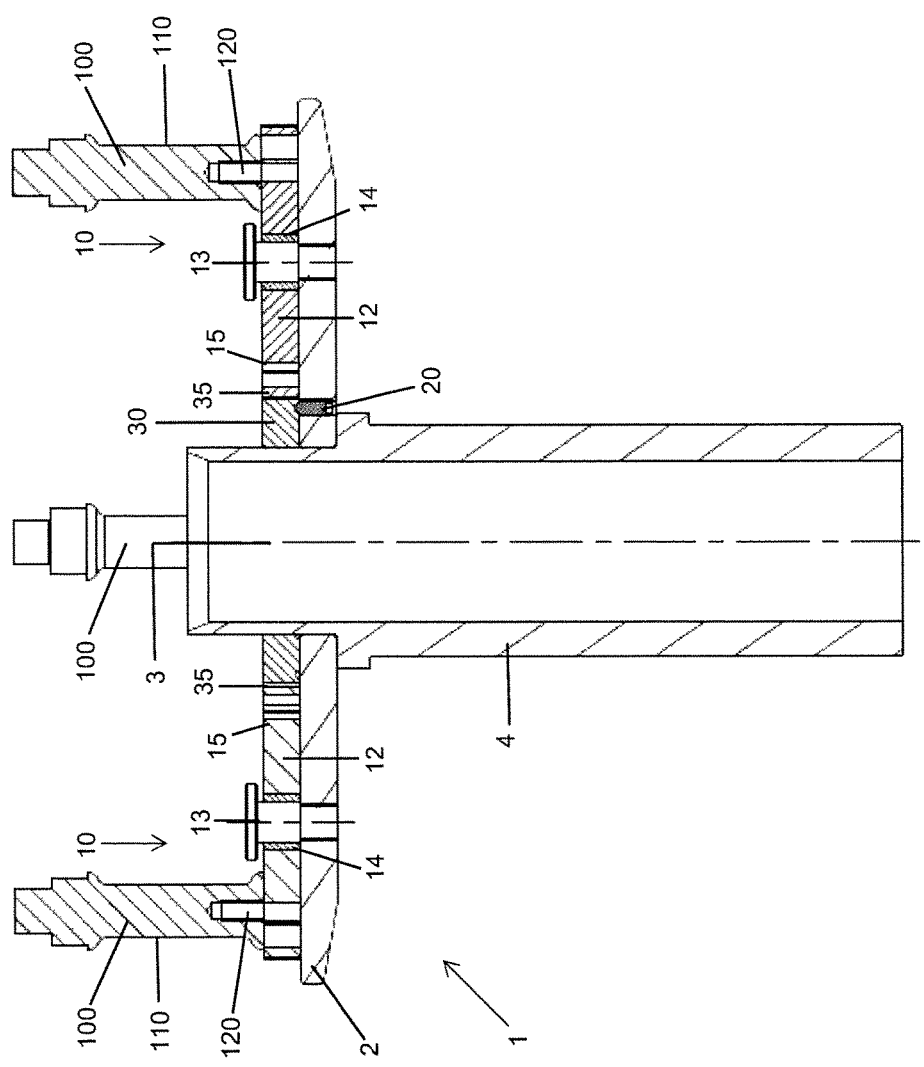
FIG. 2 shows a side view in cross section of the exemplary holding device according to the present invention.
Figure 3:
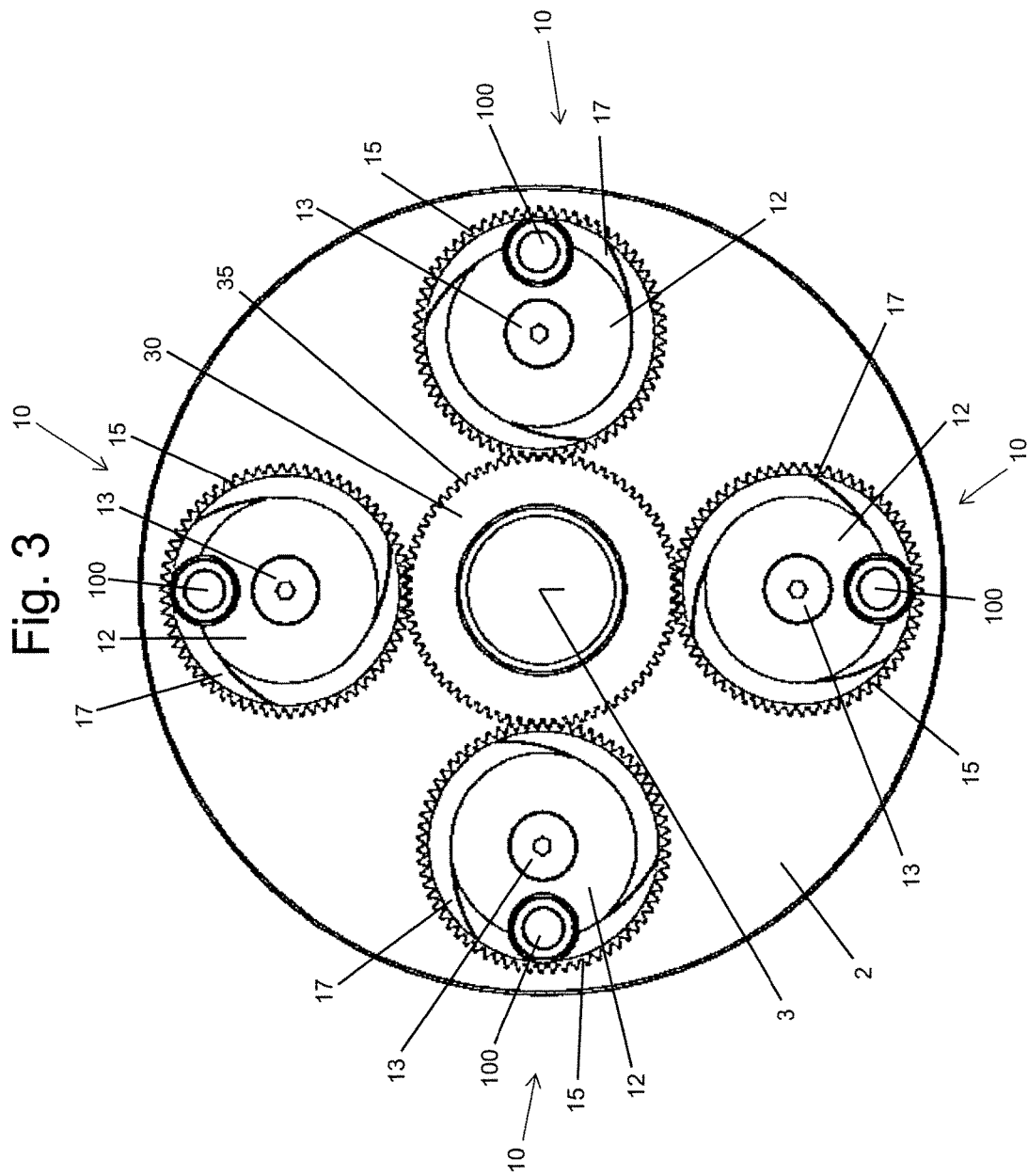
FIG. 3 shows a top view of the exemplary holding device according to the present invention.

In the example depicted in FIGS. 1 to 3, each retaining element 10 is mounted on base plate 2 by means of a central mounting portion 13. In this example, as can be seen in more detail in FIGS. 4 and 5, the central mounting portion 13 consists of a screw for screwing the respective retaining element 10 to the base plate 2 and a bushing 14 provided between the base portion 12 and the screw 13. In the perspective cross-sectional views of FIGS. 4 and 5 it can further be seen that the screw forming part of the central mounting portion 13 is screwed into a corresponding thread provided with base portion 2.

In other examples, the respective retaining element 10 can also be mounted on base plate 2 by means of different elements. For instance, the retaining element 10 can be mounted on base plate 2 via a radial shaft, such that the elastic coupling can be provided within the radial shaft instead of the radial gap 16 between base portion 12 and coupling portion 15. In this alternative example, it is further possible to use general purpose retaining elements such as general purpose satellite wheels instead of the retaining elements 10 provided with the elastic coupling portion 17 between the coupling portion 15 and the base portion 12.

Next, the locking element 20 as shown in the first example of the holding device 1 is described. As can be best seen in FIG. 5, locking element 20 consists of a locking portion 21 being inserted into through hole 22 and engaging with recess 25. In this example, through hole 22 is provided through the base plate 2 such that the locking portion 21 can be inserted therein from the lower side thereof. Recess 25 is formed on the lower surface side of the synchronization element 30, which is the surface side of synchronization element 30 facing base plate 2, such that locking portion 21 can easily engage into recess 25.

Although through hole 22 is, in this example, provided through the base plate 2, in a different example, through hole 22 could also be provided in the synchronization element 30 instead. In this alternative, the locking portion 21 can thus be inserted into the synchronization element 30 from the upper side thereof and engage with a corresponding recess formed in the base plate 2.

Further, in this example, a through hole 22 is provided for inserting the locking portion 21. However, in other examples, a locking portion 21 could also be inserted into a recess formed in the base plate 2 instead. In such example, a recess on the base plate 2 side and a corresponding recess on the synchronization element 30 side allow for the locking portion 21 to engage therewith and thus to lock a rotational position of the synchronization element 30 with respect to the base plate 2.

Next, an example of the synchronization element 30 is described in further detail with reference to FIG. 6. FIG. 6 shows a perspective view of an exemplary synchronization element 30 seen from the surface side arranged to be in front of the base plate 2 when mounted. Synchronization element 30 comprises a substantially circular synchronization body 32 with a central through hole 33 provided therein. The central through hole 33 is sized and arranged to correspond to the central through hole 3 of base plate 2. In the example shown in FIG. 6, a tooth-geared rim is provided on the outer circumferential surface as a coupling portion 35. Further, on the axial surface side shown in FIG. 6, a plurality of recesses 25 is shown. Recesses 25 allow the locking portion 21, as described above, to lock the rotational position of the synchronization element 30 with respect to the base plate 2.

The number of recesses 25 can, for example, be 60 in one example. However, also higher or lower numbers of recesses 25 are contemplated in different examples. In the end, each recess 25 allows for a discrete locking position of the synchronization element 30 and therefore the remaining elements of the planetary gear system, namely the retaining elements 10, with respect to the base plate 2. Further, in this example the number of recesses 25 is arranged in a circular pattern concentrically with the center of the synchronization element 30.

In the example shown in FIGS. 1 to 4, one through hole 21 is visible. However, it is preferred that multiple through holes 21 be provided at different positions in circumferential direction in the base plate 2. Each through hole 21 can thus be provided with a locking portion 22 fixed, for instance screwed, therein. In one example, the number of through holes and corresponding locking portions 22 is set to four or six. However, in different examples, the number of through holes 21 and corresponding locking portions 22 can also be set to a different, such as a higher or a lower number, instead. The multiple through holes can in a different example also be formed as recesses, as described above, instead.

Figure 7:
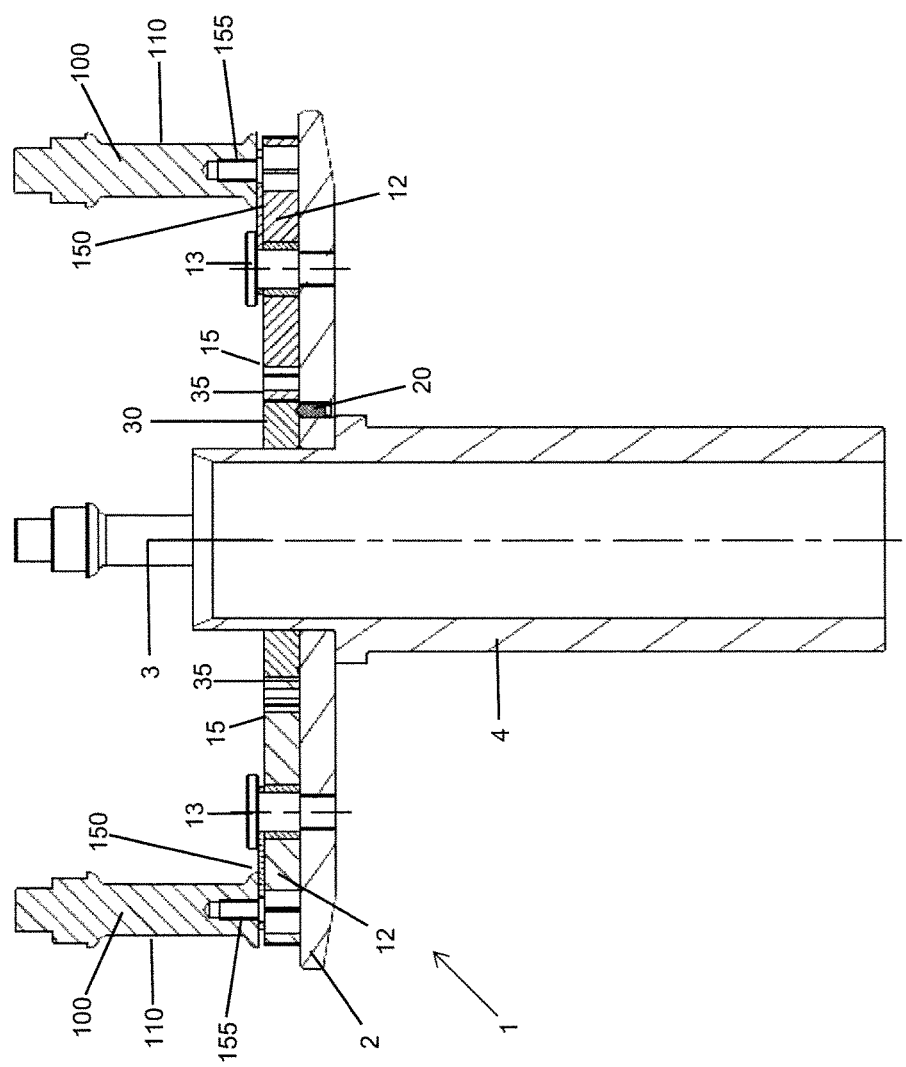
FIG. 7 shows a cross-sectional view of a different embodiment of the holding device according to the present invention.
Figure 8:
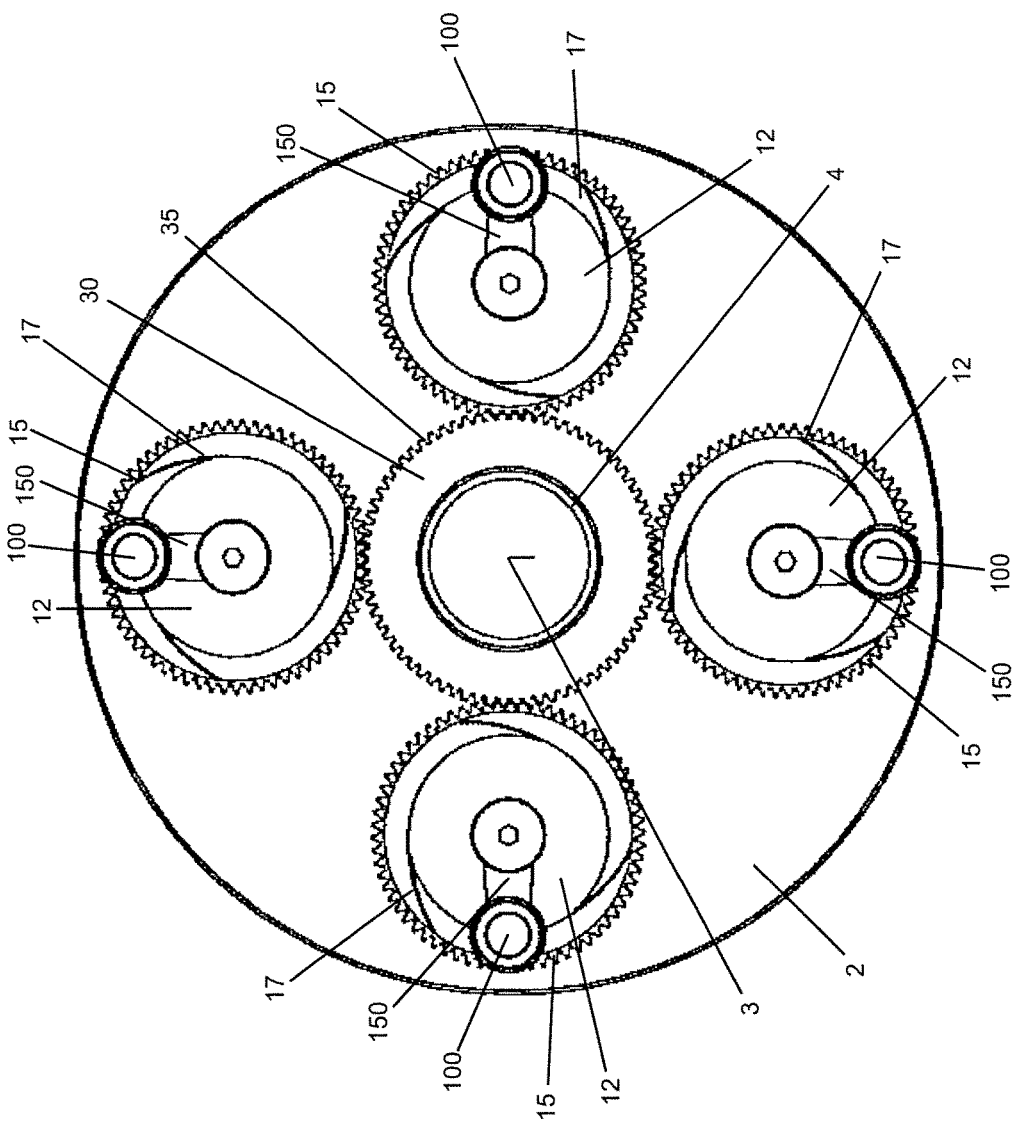
FIG. 8 shows a top view of the embodiment of the holding device according to the present invention as shown in FIG. 7.

FIGS. 7 and 8 illustrate a cross-sectional side view, and a top view, respectively, of a second example of a holding device 1 having retaining elements 10 with retaining portions 100 that differ from the retaining portions of the first example. The remaining elements, indicated by the same reference numbers as in the example described above, correspond to the same elements described above and the description thereof will be omitted.

The retaining portions 100 differ from the retaining portions of the first example in that they comprise a support lip 150 and a retaining bolt mount 155 instead of the retaining bolt mount 120. Support lip 150 is mounted on the retaining body 12 not directly but by means of screw 13. As can be seen in FIG. 8, support lip 150 has a substantially longitudinal shape extending from the central portion of the retaining element 10 radially outwards. At a radially outward position of the support lip 150 there is provided the retaining bolt mount 155. Retaining bolt mount 155 protrudes upwards from the retaining body 12 surface to engage with a recess correspondingly provided in the lower surface of retaining bolt 110.

In the first example, retaining bolt mount 120 is to be provided at a radial outward position, which has to be within the structure of the retaining body 12. Accordingly, the position of retaining bolt mount 120 and correspondingly the retaining bolt 110 engaged therewith is limited by the dimension of retaining body 12. As can be seen from FIGS. 7 and 8, by providing support lip 150 and mounting the retaining bolt 110 to the retaining element 10 by means of retaining bolt mount 155 and support lip 150, the radial distance of retaining bolt 110 from the center of the retaining element 10 is only limited by the dimension of support lip 150 and not by the dimension of retaining body 12. It is therefore possible to extend the operable range of the retaining bolt 110 over the dimension of the retaining body 12.

Figure 9:
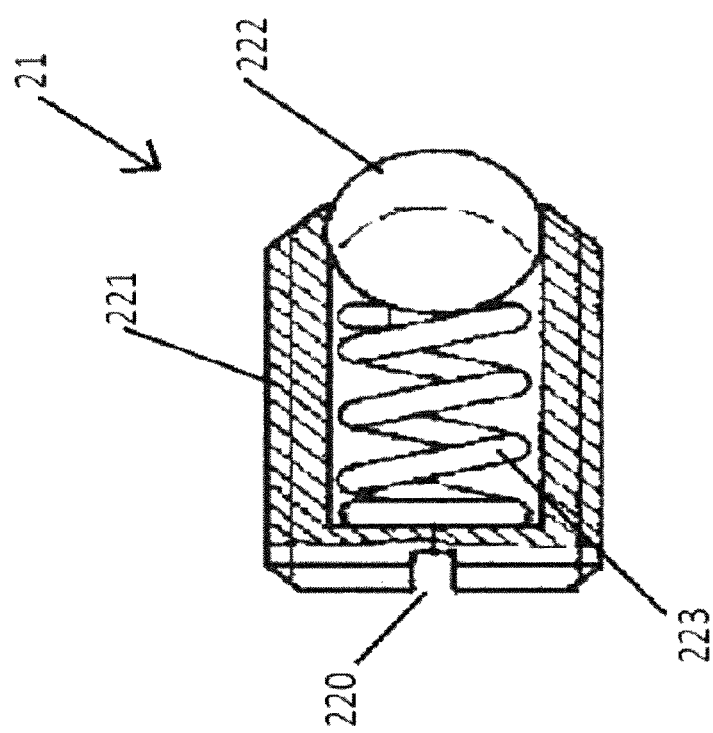
FIG. 9 shows a cross-sectional view of an exemplary locking portion according to the present invention.

FIG. 9 illustrates an example of locking portion 21 configured as a spring-loaded ball 220. Spring-loaded ball 220 is arranged for being screwed into a through hole 22 provided with a female thread corresponding to male thread 221 provided on the outer circumferential surface of spring-loaded ball 220. Spring-loaded ball 220 is of substantially cylindrical shape, wherein one of the axial surfaces is opened such that ball 222 can protrude therefrom. The protrusion of ball 222 is loaded by means of spring 223 provided within a hollow portion of a cylindrical hull. By variation of the spring 223 it is possible to adjust the force, with which ball 222 protrudes out of the spring-loaded pin or ball 220. This force accounts for the ball 222 engaging within a recess 25 formed in the synchronization element 30 or the base plate 2, when the locking portion 21 is inserted into a through hole 22 of the corresponding other of the base plate 2 or the synchronization element 30. Although the locking portion 21 is in this example formed as a spring-loaded ball 220, also different forms of locking portions 21 are of course contemplated as alternatives by a person skilled in the art, for instance, a spring-loaded pin or other elements are contemplated.

LIST OF REFERENCE SIGNS 1 holding device
2 base plate
3 through hole
4 hollow shaft
10 retaining element
12 base portion
13 central mounting portion
15 coupling portion
16 gap
17 elastic coupling portion
20 locking element
21 locking portion
22 through hole
25 recess
30 synchronization element
32 synchronization body
33 through hole
35 coupling portion
100 retaining portion
110 retaining bolt
120 retaining bolt mount
150 support lip
155 retaining bolt mount
220 spring-loaded ball
221 male thread
222 ball
223 spring

The invention claimed is:

1. A holding device for a rim of a vehicle wheel, comprising:
    a base plate having a central through hole for sliding onto a shaft of a balancing machine;
    a plurality of retaining elements rotatably mounted on the base plate, each including a rotatable base portion and a retaining portion mounted on the rotatable base portion;
    a synchronization element configured to synchronize the rotation of the retaining elements, and rotatably provided on the base plate; and
    a locking element for locking a rotational position of at least one of the plurality of retaining elements or the synchronization element,
    wherein the plurality of retaining elements and the synchronization element respectively include coupling portions for form-fitting coupling of the rotational movement of the plurality of retaining elements and the synchronization element, and
    wherein at least one of the plurality of retaining elements includes an elastic coupling portion configured to bias the coupling portion of the at least one of the plurality of retaining elements towards the synchronization element, for ensuring the form-fitting coupling of the synchronization element and the at least one of the plurality of retaining elements, the elastic coupling portion fixedly attached to the rotatable base portion and the coupling portion of the at least one of the plurality of retaining elements and configured to transfer torque between the rotatable base portion and the coupling portion of the at least one of the plurality of retaining elements.

2. The holding device of claim 1, wherein:
the locking element provides discrete locking positions of the rotational position of at least one of the plurality of retaining elements or the synchronization element with respect to the base plate.

3. The holding device of claim 1, wherein:
each of the plurality of retaining elements is configured as a satellite wheel and the synchronization element is configured as a sun wheel, wherein the satellite wheels and the sun wheel form a planetary gear system.

4. The holding device of claim 1, wherein:
the corresponding coupling portions of the synchronization element and the plurality of retaining elements are corresponding toothed rims provided to the outer circumference of the respective elements.

5. The holding device of claim 1, wherein:
the base portion has a central mounting portion for mounting the retaining element on the base plate and for defining a rotation axis of the respective retaining element,
the retaining portion mounted on the base portion is configured to engage with the rim of the vehicle wheel, and
the coupling portions of each of the retaining elements are provided concentrically with the central mounting portion to the outer circumferential side of the base portion.

6. The holding device of claim 5, wherein:
the base portion has an outer peripheral diameter smaller than the inner peripheral diameter of the coupling portion such that a gap is formed between the coupling portion and the base portion, and
wherein the elastic coupling portion is provided in the gap between the coupling portion and the base portion for elastically coupling the base portion and the coupling portion.

7. The holding device of claim 5, wherein:
the elastic coupling portion is formed of a plurality of curved flat springs.

8. The holding device of claim 5, wherein:
the retaining portion is formed by a retaining bolt which is replaceably mountable to the base portion by means of a retaining bolt mount, such that the retaining bolt is arranged eccentrically to the axis of rotation of the retaining element.

9. The holding device of claim 8, wherein:
the retaining bolt mount is arranged as an adapter pin with a thinner diameter than the retaining bolt, wherein the adapter pin is arranged to engage with a recess in the base portion and with a recess in the retaining bolt.

10. The holding device of claim 8, wherein:
the retaining bolt mount comprises a support lip and an adapter pin, wherein
the support lip is mounted on the base portion, and
wherein the adapter pin is provided on a radially outward position on the support lip and arranged to engage with a recess in the retaining bolt.

11. The holding device of claim 1, wherein:
the locking element comprises:
a locking portion,
at least one recess formed in the base plate on the surface facing the synchronization element, and
at least one recess formed in the synchronization element on the surface facing the base plate, wherein
wherein the locking portion is arranged to simultaneously engage with one recess formed in the base plate and one recess formed in the synchronization element.

12. The holding device of claim 11, wherein:
at least one of the recesses formed in the base plate or the synchronization element is configured as a locking through hole,
wherein the locking portion is arranged to fit into the locking through hole from the side of the base plate or the synchronization element, respectively, opposite of the contacting surface of the base plate and the synchronization element.

13. The holding device of claim 11, wherein:
several recesses are provided in an uneven distance to each other in the circumferential direction.

14. The holding device of claim 10, wherein:
the support lip is mounted on the base portion by means of the central mounting portion.

15. The holding device of claim 12, wherein:
the locking portion is arranged to fit into the locking through hole by a male thread of the locking portion screwed into a corresponding female thread of the locking through hole.

16. The holding device of claim 8, wherein:
the synchronization element comprises a substantially circular synchronization body portion, arranged parallel to and concentrically with the through hole of the base plate, having a central through hole with a diameter corresponding to the diameter of the through hole of the base plate or larger,
wherein the coupling portion is provided to the radial outer circumferential side of the synchronization body portion, and
wherein the synchronization element comprises the elastic coupling portion for elastically coupling the coupling portion in a radial direction with respect to the central through hole, and
wherein the elastic coupling portion is provided within the central through hole or sandwiched between the coupling portion and the synchronization body portion.

17. The holding device of claim 11, wherein:
the locking portion is configured as a spring pin, wherein the spring pin comprises a spring and a spring-loaded pin or ball,
wherein the spring pin is arranged for engaging the recess of the base plate or the synchronization element by means of the spring-loaded pin or ball due to an expansion of the spring.

* * * * *